US008369305B2

(12) United States Patent
Diener et al.

(10) Patent No.: US 8,369,305 B2
(45) Date of Patent: Feb. 5, 2013

(54) CORRELATING MULTIPLE DETECTIONS OF WIRELESS DEVICES WITHOUT A UNIQUE IDENTIFIER

(75) Inventors: Neil R. Diener, Hudson, OH (US); Gary L. Sugar, Cleveland, OH (US); Brian Donald Hart, Sunnyvale, CA (US); Igal Gutkin, Redwood City, CA (US); David Kloper, Hudson, OH (US)

(73) Assignee: Cisco Technology, Inc., San Jose, CA (US)

( * ) Notice: Subject to any disclaimer, the term of this patent is extended or adjusted under 35 U.S.C. 154(b) by 1205 days.

(21) Appl. No.: 12/164,474

(22) Filed: Jun. 30, 2008

(65) Prior Publication Data

US 2009/0327333 A1    Dec. 31, 2009

(51) Int. Cl.
*H04B 7/212*    (2006.01)
(52) U.S. Cl. .................... 370/347; 455/67.11
(58) Field of Classification Search .................. None
See application file for complete search history.

(56) References Cited

U.S. PATENT DOCUMENTS

| | | | |
|---|---|---|---|
| 6,850,735 | B2 | 2/2005 | Sugar et al. |
| 7,006,838 | B2 | 2/2006 | Diener et al. |
| 7,035,593 | B2 | 4/2006 | Miller et al. |
| 7,116,943 | B2 | 10/2006 | Sugar et al. |
| 7,171,161 | B2 * | 1/2007 | Miller .................. 455/67.11 |
| 7,184,777 | B2 | 2/2007 | Diener et al. |
| 7,269,151 | B2 * | 9/2007 | Diener et al. ............. 370/329 |
| 7,403,744 | B2 * | 7/2008 | Bridgelall ................. 455/41.2 |
| 7,688,802 | B2 * | 3/2010 | Gonia et al. ............. 370/350 |
| 2006/0128311 | A1 | 6/2006 | Tesfai |
| 2007/0264939 | A1 | 11/2007 | Sugar |

OTHER PUBLICATIONS

International Search Report and Written Opinion dated Aug. 3, 2009; cited in PCT/US2009/037915.
Jookwan Lee et al., "Weighted-Cooperative Spectrum Sensing Scheme Using Clustering in Cognitive Radio Systems," 10th International Conference on Advanced Communication Technology, Feb. 17-20, 2008, pp. 786-790.
Lei Gong et al., "Application of Clustering Structure in the Hierarchical Spectrum Sharing Network Based on Cognitive Radio," 3rd International Conference on Cognitive Radio Oriented Wireless Networks and Communications, May 15, 2008, pp. 1-5.
Sun C et al., "Cluster-Based Cooperative Spectrum Sensing in Cognitive Radio Systems," International Conference on Communications, Jun. 1, 2007, pp. 2511-2515.
Akyildiz et al., "NeXt Generation/Dynamic Spectrum Access/Cognitive Radio Wireless Networks : A Survey," Computer Networks, Elsevier Science Publishers B.V., vol. 50, No. 13, Sep. 15, 2006, pp. 2127-2159.

* cited by examiner

*Primary Examiner* — Nittaya Juntima
*Assistant Examiner* — Rhonda Murphy
(74) *Attorney, Agent, or Firm* — Edell, Shapiro & Finnan, LLC

(57) ABSTRACT

At a plurality of first devices, wireless transmissions are received at different locations in a region where multiple target devices may be emitting. Identifier data associated with reception of emissions from target devices at multiple first devices is generated. Similar identifier data associated with received emissions at multiple first devices are grouped together into a cluster record that potentially represents the same target device detected by multiple first devices. Data is stored that represents a plurality of cluster records from identifier data associated with received emissions made over time by multiple first devices. The cluster records are analyzed over time to correlate detections of target devices across multiple first devices.

27 Claims, 7 Drawing Sheets

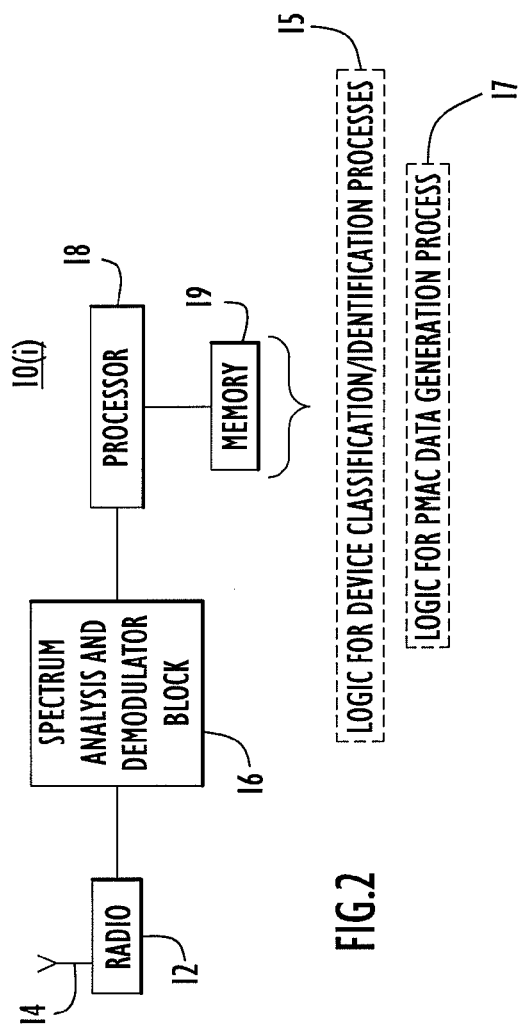
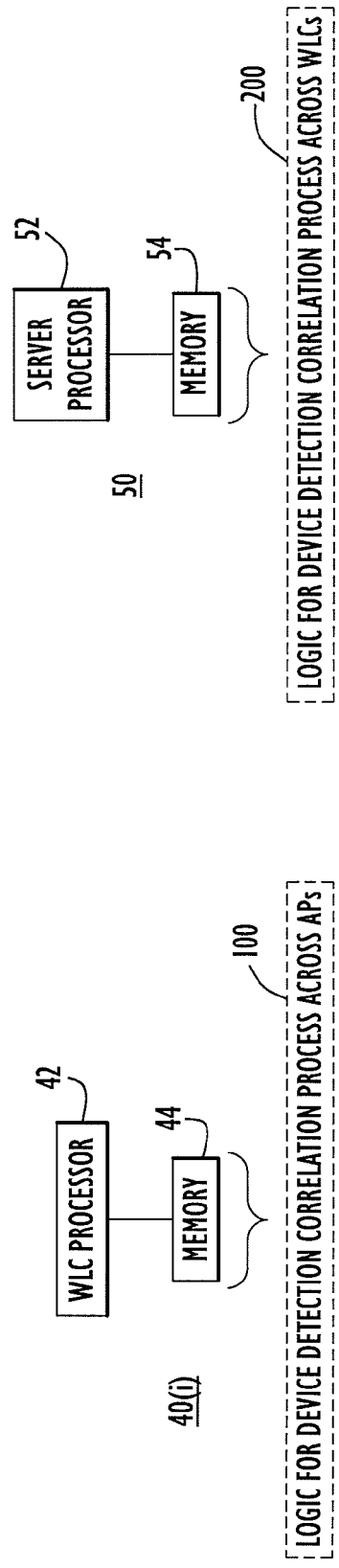

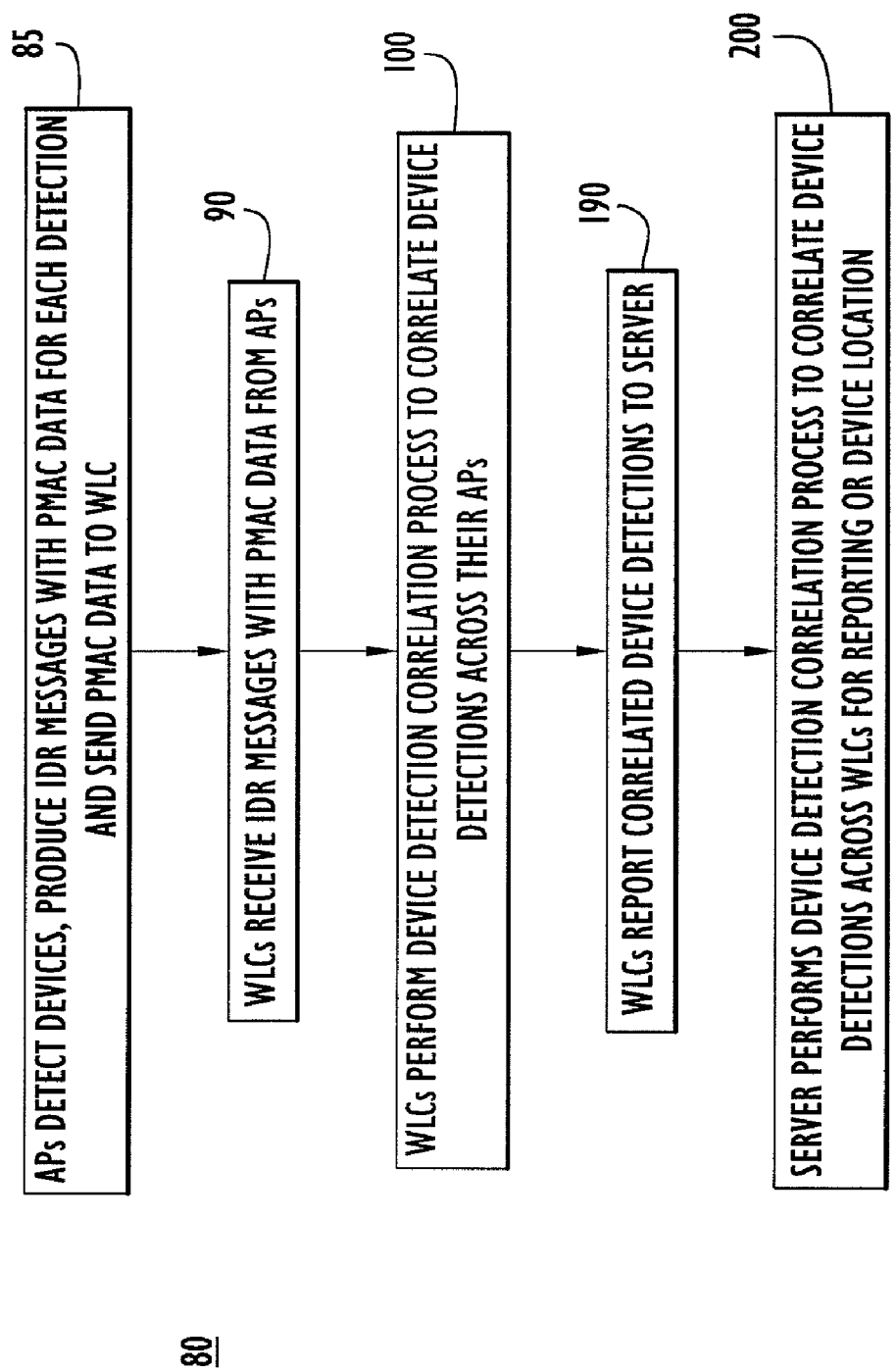

CORRELATING MULTIPLE DETECTIONS OF WIRELESS DEVICES WITHOUT A UNIQUE IDENTIFIER

BACKGROUND

Wide market adoption of various incompatible or weakly compatible wireless devices has significantly increased interference in the public bands utilized by wireless local area networks (WLANs). When devices using multiple protocols coexist in the same frequency band they may cause significant mutual service disruptions. While some technologies, such as WiFi™, implement measures to avoid signal collisions when other devices are transmitting, other technologies allow transmitting regardless of the medium status. Some wireless devices may also be viewed as security problems, either due to interference with mission critical WLANs, or because they may allow unsecured leakage of confidential information (for example, wireless cameras, microphones, data bridges, etc.). There are also non-standard forms of WLANs that operate on non-standard channels in the same frequency band as standard WLANs. Scanning the frequency band with device using a standard WiFi chipset to detect such non-standard WLAN equipment would be time-prohibitive. In addition, there are WiFi chipsets that have proprietary modes of operation that only such chipsets can recognize. For these reasons, it has become increasingly important to detect, identify and locate non-standard WLAN and other wireless devices.

Utilizing a network of distributed wireless sensors capable of detecting various protocols and device types is the first step. But a workable system requires an ability to correlate detections of the same device by multiple sensors, while maintaining an ability to differentiate between unique but similar devices. Without such capability, network administrators will be overwhelmed with redundant detection reports of the same device. Furthermore, without correlating device detections, it is difficult to implement advanced system features such as locating devices based on signal triangulation/trilateration/receive signal strength fingerprinting, or to understand the distribution of wireless interference devices in a controlled territory.

BRIEF DESCRIPTION OF THE DRAWINGS

FIG. 2 is an example of a block diagram of a radio device equipped to detect and identify emissions from wireless devices in the wireless communication environment of FIG. 1.

FIG. 3 is an example of a block diagram of a first computing device that is connected to a plurality of radio devices of the type shown in FIG. 2.

FIG. 4 is an example of block diagram of a second computing device that is connected to a plurality of first computing devices of the type shown in FIG. 3.

FIG. 5 is an example of a flow chart depicting device detection by radio devices and correlation processing by the first and second computing devices.

DETAILED DESCRIPTION

Overview

When utilizing a network of distributed wireless sensors capable of detecting various protocols and device types, it is important to correlate detections of the same device by multiple sensors while differentiating between unique but similar devices. Without such a capability, users will be overwhelmed with redundant detection reports of the same device. In some cases correlation is made easier by the protocol providing a unique identification of the emitting devices, such as a unique medium access control (MAC) address (802.11, WiMax, Bluetooth, etc). Some devices, like microwave ovens, analog devices, cordless phones using proprietary protocols, etc., either do not have a provision allowing for uniquely identifying emitters, or have identifiers that are too difficult for a general protocol-agnostic spectrum monitoring device to decipher. Accordingly, at a plurality of first radio devices (radio sensor devices), wireless emissions are received at different locations in a region where multiple target devices may be emitting. Identifier data associated with reception of emissions from target devices at multiple first devices is generated. Similar identifier data associated with received emissions at multiple first devices are grouped together into a cluster record that potentially represents the same target device detected by multiple first devices. Data is stored that represents a plurality of cluster records from identifier data associated with received emissions made over time by multiple first devices. The cluster records are analyzed over time to correlate detections of target devices across multiple first devices. The term "emission" herein is used to include both intentional emissions of a device (i.e., a "transmission") as well as inadvertent or unintentional emissions of RF energy by a device, such as an microwave oven or other appliance.

The techniques described herein allows for significantly simpler differentiation and correlation for detected wireless devices utilizing radio frequency (RF)-proximity clustering and a heuristic merge criteria. The combination of a clustering algorithm, along with the heuristic merge criteria allows reliable merging of various types of wireless devices with a distributed network of sensors to occur in a general fashion, independent of intimate knowledge about specific protocol.

Figure 1:
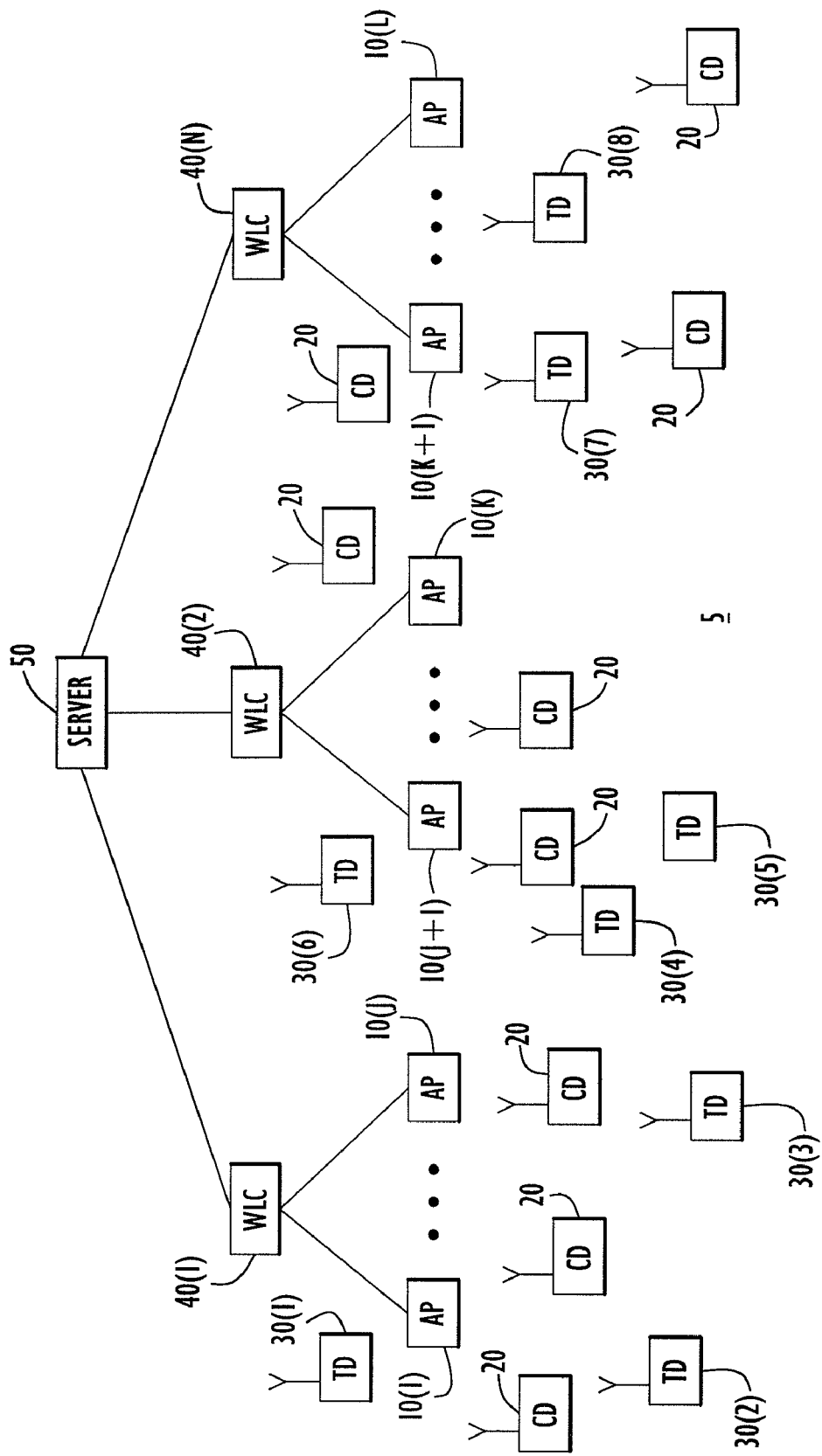
FIG. 1 is an example of a block diagram of a wireless communication environment in which correlation of multiple detections of emissions from wireless devices is made.

Referring first to FIG. 1, wireless system/network environment is shown at 5 in which a plurality of wireless network access point (AP) devices are deployed to serve wireless client devices. The number of APs and client devices will vary on the particular network deployment and application. FIG. 1 shows an example in which there are APs 10(1)-10(L) and a plurality of client devices (CDs) 20. The APs 10(1)-10(L) may serve the client devices using wireless local area network (WLAN) technology such as that provided according to the rules of the IEEE 802.11 protocols, also known commercial as WiFi™. Other devices may be operating in the proximity of the WLANs established by the APs 10(1)-10(L) and CDs 20, and emissions from those devices can interfere with the performance and operation of the WLANs. For simplicity, these devices are referred to as target devices (TDs), examples of which are shown at reference numerals 30(1)-30(8). The TDs may be any device (non-WLAN, non-standard WLAN, etc.) whose operation in the vicinity of the WLANs established by the APs 10(1) to 10(L) is to be detected and perhaps located. To this end, the APs 10(1)-10(L) have the capability of analyzing the radio frequency spectrum that the WLANs operate in order to detect and classify these devices. APs that are equipped to analyze the frequency spectrum in this manner are referred to herein as radio sensor devices (also the aforementioned "first radio devices"). Examples of TDs are microwave ovens, devices that operate in accordance with the Bluetooth™ communication protocol technology, cordless telephone handsets and base stations, wireless video streaming devices, non-standard WLAN devices, WLAN devices that operate with proprietary modes, etc.

FIG. 1 also shows an example of a system architecture in which groups of APs are connected to a corresponding one of a plurality of wireless LAN controllers (WLC) 40(1)-40(N) and the WLCs 40(1)-40(N) are in turn connected to a main or central server 50. For example, APs 10(1)-10(J) are connected to WLC 40(1), APs 10(J+1)-10(K) are connected to WLC 40(2), . . . and APs 10(K+1)-10(L) are connected to WLC 40(N). The WLCs 40(1)-40(N) may be, for example, computers that execute software to manage the APs to which they are connected. The server 50 is a computer (or multiple computers) that manages the WLCs. Either the WLCs or the server may perform computations to locate a particular device, such as a CD or a TD.

One of the challenges in managing the WLANs is identifying the TDs occurring in proximity to the WLANs and locating those TDs for purposes of troubleshooting the impact they have on WLAN performance. In many cases, multiple APs may detect the same TD, making it more complicated to ascertain how many TDs are actually present and also to distinguish between the receive signal strength indicator (RSSI) data from associated with detections of a TD across multiple APs.

In some cases correlation is made easier because the communication protocol used by the TD employs a unique identification for each device, such as a unique medium access control (MAC) address (802.11, WiMax, Bluetooth, etc). However, in most cases, the TD is a device that does not transmit a unique identifier. For example, devices such as microwave ovens, analog devices, cordless phones using proprietary protocols, etc., either do not have a provision allowing for uniquely identifying transmitters, or have identifiers that are too difficult for a general protocol-agnostic spectrum monitoring device (or a similarly equipped-AP) to decipher, or would require measurements made over a wider bandwidth than the capabilities of the AP.

Referring now to FIG. 2, an example of a block diagram of a spectrum sensing equipped AP (i.e., a radio sensor device—a first radio device) generically shown at 10(i) in FIG. 2 is now described. The device 10(i) comprises a radio 12 that receives RF signals detected by an antenna 14 and supplies the received signals to a spectrum analysis and demodulator block 16. A processor 18 is coupled to the spectrum analysis and demodulator block 16. The processor 18 executes logic to perform one or more functions or tasks in the device 10(i), including device classification/identification processes 150 and a pseudo-MAC (PMAC) data generation process 17. Because the APs 10(1)-10(L) shown in FIG. 1 are equipped to analyze the received emissions from TDs for purposes of device classification/identification and PMAC data generation, the APs are also referred to herein as radio devices or simply "sensors". Moreover, some APs may be configured to operate solely as a sensor, whereby such APs would not be serving traffic with CDs and other APs may have both transmit and receive capabilities and thus could serve traffic with CDs.

The processor 18 may be a programmable processor that executes software (e.g., processor readable) instructions stored in a memory 19. Alternatively, the processor may be embodied as a fixed hardware that includes logic to perform the device classification/identification and PMAC data generation processes 15 and 17, respectively. To this end, the functions of the processor 18 may be embodied by any logic (programmable or fixed) encoded in one or more tangible media, e.g., embedded logic such as an application specific integrated circuit, digital signal processor instructions, etc.

The PMAC data is also referred herein to more generally as "identifier data" associated with a received emission. The data that makes up the PMAC for a detected device is now described.

Unique identifier (ID). Some wireless devices are uniquely identifiable by a unique ID that is contained in their transmissions. In this case, when the same device is detected by multiple sensors, they may be merged into a single record without checking other characteristics (other PMAC data).

Semi-unique ID. In certain cases it is possible to identify a pair or group of devices using the same semi-unique identification number during data exchange. That is, some wireless devices show the address of a network, rather than an address of the individual device, giving a partial solution. For example, wireless devices that use the Digital Enhanced Cordless Telecommunication (DECT) standard (e.g., cordless telephone systems) use a network address, but only includes it in a subset of the packets. As another example, (master and slave) devices operating on the same network, such as a Bluetooth™ piconet will use the same identifier. In addition, some wireless devices do not include all of the digital address in most packets, and so only a partial match may be possible. For example, wireless devices that transmit with the Bluetooth communication protocol include 24 bits of the address in a packet. Some devices encrypt the field containing the address. Some implementations of wireless devices that use the DECT standard include the address as part of an encrypted packet and so no CRC validating or confirming of the address field being present are possible. In these cases, the actual address cannot be used to correlate between specific devices in the pair or group when detected by multiple sensors. Accordingly, the semi-unique identifying information can be supplemented by additional information to create unique IDs. This supplemental information may include timing information about the transmissions by each device in the group, or by comparing device-specific fine RF characteristics among individual devices, or by other protocol specific methods, examples of which are described herein.

Synchronization word. The sync word in a transmission of a wireless device can be detected and used to differentiate devices.

Sync word polarity. Some wireless devices, such as those that use the DECT standard, have sync words with different polarities for the handset(s) than for the base station.

RF characteristics. Many fixed frequency interferers can be distinguished by center frequency and bandwidth of the bursts or pulses of energy that they use when transmitting. These RF characteristics do not yield an exact match across sensors due to measurement errors. The captured RF signature at a sensor depends on the mode of operation of the sensor, the received signal-to-noise ration (SNR) of the signals received by a sensor, how long the sensor has been measuring for the device, frequency variation in the crystal oscillator the sensor, etc. For frequency hopping TDs, there would be a set of center frequencies that the TD has been detected on, but that set may not be a good criteria for matching. Some sensors may only be monitoring on a fixed channel, such as in an AP, and so the set of frequencies visible to different sensors might not overlap. In addition, the RF environment may make detection on some common frequencies more difficult. However, each frequency hopping device usually transmits in a pre-defined band, so the detected band can be used for differentiating purposes. For example, the same device will not typically be capable of transmission simultaneously in both 2.4 GHz and 5 GHz bands. Devices detected in the same band are considered as candidates for further merge.

Sensor type/mode. The sensors themselves may produce variations in the PMAC data they generate due to variations or impairments in the radio circuitry of the sensors (especially over periods of time). In addition, the mode in which the sensor is in when it captured the data for a received signal from a wireless device may affect the nature of the data it captures. For example, a sensor may be operating in a fixed frequency receive mode with one of several channel widths (e.g., 20 MHz versus 40 MHz). There may be certain constraints on automatic gain control functions when the sensor is one mode versus another mode. In addition, the PMAC data may be affected by how long a sensor has been monitoring on a particular channel, and how recently did it monitoring change modes.

Modulation type. The modulation format used in a transmission by a wireless device, such as BPSK/QPSK/QAM, DSSS/CCK, etc. Some protocols include dynamic rate adaptation, so that several modulation types may be present.

Device type: Device type may be the output of the classification/identification analysis performed in a sensor, and includes, for example, an indicator of whether the device is fixed frequency or frequency hopping. Fixed frequency devices may be further broken down into time division duplex (TDD) phones, FM devices, wireless video devices, etc. Frequency hopping devices may be further broken down into devices such as DECT type 2 or 3 devices, generic frequency hopper devices, etc. Other device type designators may include "continuous", "jammers" (and their associated sweep rate). Techniques for classifying received RF energy to determine the type of device associated with such transmissions are disclosed in commonly assigned U.S. Pat. Nos. 6,805, 735; 7,116,943; 7,171,161; 7,035,593; 7,292,656, and commonly assigned and co-pending U.S. Patent Application Publication No. US 2007-0264939 A1, all of which are incorporated herein by reference. These patents and published patent application disclose techniques for classifying received emissions based on RF characteristics such as center frequency and bandwidth, as well as timing, modulation features, etc.

Pulse size and timing. Some wireless devices use protocols that have fixed pulse sizes or timing (phase and period). These parameters may be included in the PMAC data.

Analog characteristics. Characteristics such as local oscillator leakage, power amplifier ramp up time and ramp down time, power amplifier overshoot, fine frequency estimation. Again requires very accurate timing lock between sensors for many of these.

Frequency hopping sequence. The frequency hopping sequence used by a frequency hopping device can be used to derive phase information, and/or common seeds.

When a sensor detects a TD, it generates a report that contains the PMAC data for that detection together with other information. This report may be referred to herein as an Interferer Detection Report (IDR). The table below sets forth an example of the data that may be included in an IDR.

| Parameter name | Description |
| --- | --- |
| Device Type | Device type designator. |
| Instance ID | Unique for all active instances from a given sensor (current and recently down). |
| Interference Severity Index | Range of 1-100. |
| Interference Duty Cycle | Estimated percentage of time that the device is transmitting, across all channels. |
| Event type | Device up/down/update. |
| Radio Band ID | 2.4 GHz/5 GHz/other. |
| Timestamp | Time of detection |
| Detected on Channels | Detection on multiple channels within the same radio band (bitmap). |
| Antenna ID Rx Power (RSSI) per antenna | Indication of which antenna(s) the device's signal is received on, as well as the RSSI associated with reception of the signal on that antenna. |
| PMAC | The PMAC data described above. |

The sensors transmit messages containing these IDRs as they are generated to their associated WLC.

Turning to FIG. 3, an example of a block diagram of a WLC, generically shown at reference numeral 40(i). The WLC 40(i) comprises a WLC processor 42 and memory 44 that stores software program logic 100 that, when executed by the processor 42, causes the processor 42 to perform a device detection correlation process across the sensors to which the WLC is connected.

FIG. 4 illustrates an example of a block diagram of the server 50. The server 50 comprises a server processor 52 and memory 54. The memory 54 stores software program logic 200 that, when executed by the processor 52, causes the processor 52 to perform a device detection correlation process across WLCs.

The functions of the processors 42 and 52 shown in FIGS. 3 and 4 may be embodied by any logic (programmable or fixed) encoded in one or more tangible media, e.g., embedded logic such as an application specific integrated circuit, digital signal processor instructions, etc. Similarly, these functions may be distributed across multiple processors or handled using arbitrary levels of hierarchy.

Turning to FIG. 5, an example of a flow chart depicting the overall device detection and correlation process from the sensors to WLCs to the server is described, where reference numeral 80 indicates this overall process. At 85, sensors detect non-WLAN devices, generate PMAC data for those device detections, produce and send IDR messages to their associated WLC. At 90, the WLCs received the IDR messages from their associated sensors. At 100, the WLCs perform the aforementioned device detection correlation processor to correlate device detections across their sensors. At 190, the WLCs send reports about the correlated device detections to the server. At 200, the server performs the aforementioned device detection correlation process across the WLCs.

Figure 6:
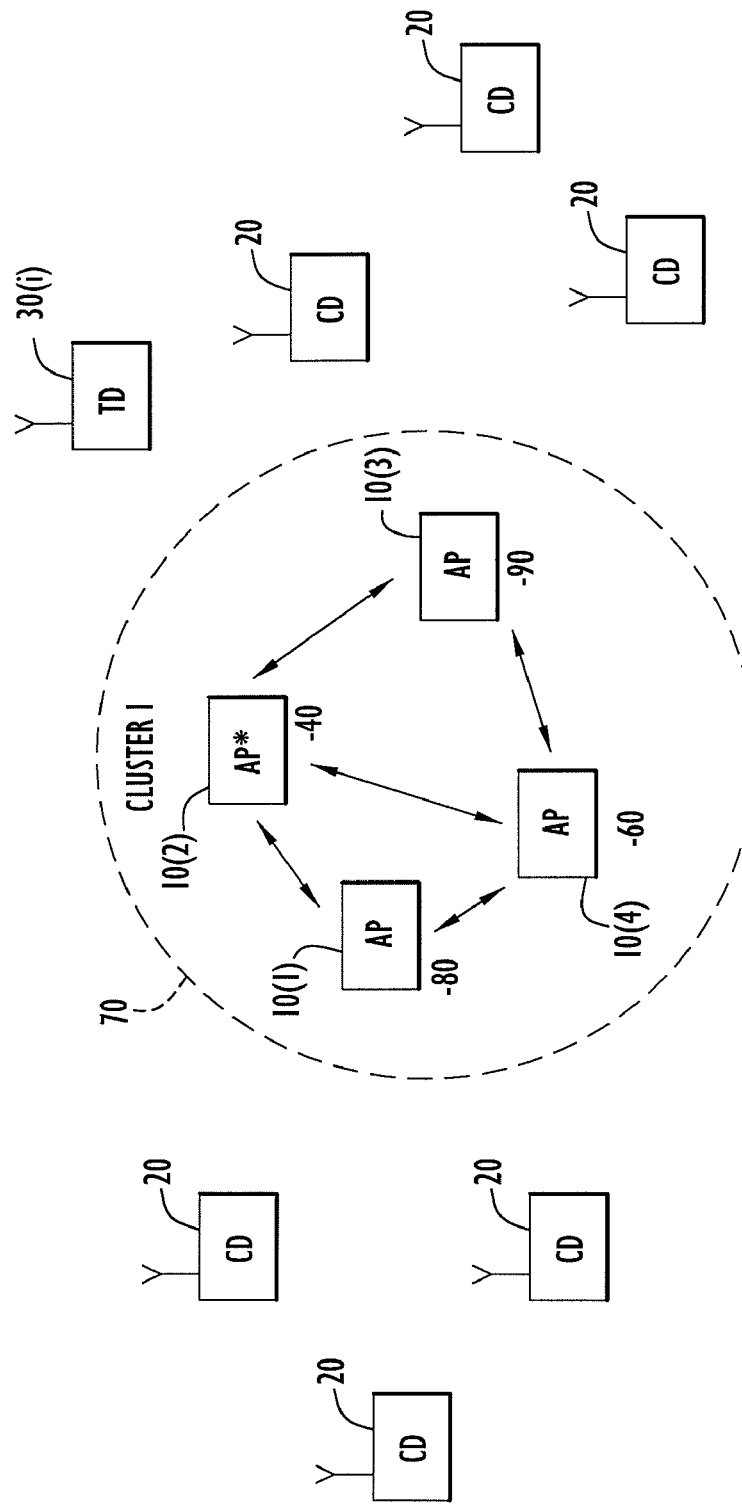
FIG. 6 is a block diagram illustrating an example of grouping data from detected wireless device emissions across multiple radio devices into a cluster.

The techniques described herein allow for simpler differentiation and correlation of detected wireless devices across multiple sensors or sensing APs utilizing RF-clustering and heuristic merge criteria. Turning to FIG. 6, the concept of clustering is now described. Using the PMAC data from IDR messages received from multiple sensors, multiple detections of the same device from multiple sensors may be combined into a single aggregated PMAC-based device record referred to herein as a "cluster". Thus, a cluster is a collection of PMAC data received from different sensors that are determined to be similar enough to each other so that it can be declared that the PMAC data corresponds to the same device detected by those sensors.

For example, as shown in FIG. 6, sensors 10(1)-10(4) all detect a particular TD 30(*i*) and generate PMAC data that, when compared with each other, results in a decision to combine the PMAC data from those sensors into a cluster designated Cluster 1 at reference numeral 70. The arrows shown in FIG. 6 indicate that the PMAC data records from the corresponding sensors match. That is, those PMAC data records exhibit a good pairwise merge. The relative proximity of blocks in FIG. 6 is not meant to necessarily represent the actual relative position of the TD 30 to a sensor nor the relatively positions of sensors to each other. PMAC data received from sensors over time are compared with each other to determine cluster assignment. Clusters can be merged together under certain conditions.

Every cluster record has a cluster record center that corresponds to the PMAC data of the sensor that detects the interferer with the strongest RSSI or with the strongest SNR. The PMAC data that is designated at the cluster center may be more generally considered the representative identifier data for a cluster. In the example of FIG. 6, the PMAC data for sensor 10(2) would be deemed the cluster center PMAC record for cluster 70. Two clusters are merged together only when the two cluster centers can be pairwise merged, based on the criteria previously described. The PMAC data of the sensor that detects the interferer at the strongest RSSI or strongest SNR becomes the cluster center for the merged cluster. These clusters may not be 1-hop clusters if the cluster center changes too often. After formation of a cluster, the cluster center PMAC record can change to a different sensor when the PMAC data for that sensor has a stronger RSSI or SNR than the existing cluster center PMAC data record. To avoid needless toggling between cluster centers, a threshold may be used that the RSSI or SNR difference between that of the existing cluster center and another PMAC record in the cluster must exceed before switching the cluster center to that other PMAC record. Clusters can also be split into two or more separate clusters when sensors that cannot "hear" each other report strong RSSIs or SNRs in matching PMAC data records. Data for a cluster is stored in what may be referred to as a cluster record.

Clustering works best when the cluster starts with a good cluster center (i.e., highest RSSI or SNR). One way to accomplish this is to buffer PMAC data from sensors until all sensors would be expected to report. Individual detections are deleted from the cluster when a sensor stops reporting the device. The data for a cluster record can be removed when all the sensors timeout by failing to continue to detect that device for a certain time interval. Another way to ensure good clustering is to re-evaluate cluster decisions after a period of time during which additional PMAC data has been accumulated. This latter cluster re-evaluation technique has the benefit of not waiting for a sufficient buffer to be established before building cluster records.

Figure 7:
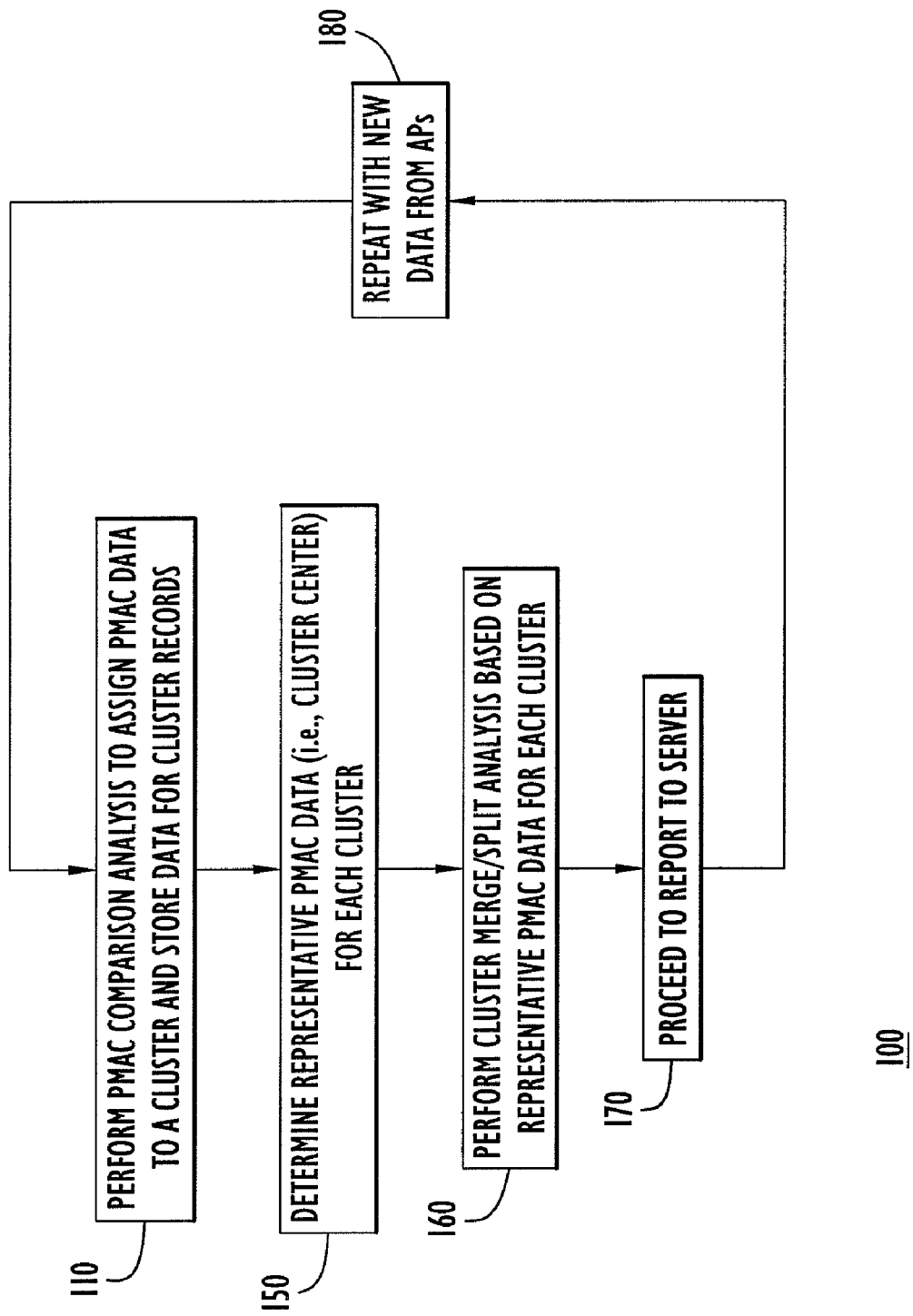
FIG. 7 is an example of a flow chart depicting a process for correlating detected wireless device emissions across multiple radio devices.

Referring now to FIG. 7, the device detection correlation process 100 performed by the WLCs is now described. At 110, the WLC performs a comparison of the PMAC data contained in the IDR messages it has received from its associated sensors. This PMAC comparison process at 110 is described in detail hereinafter in conjunction with FIG. 8. One result of the PMAC comparison process is that a PMAC data record may be assigned to an existing cluster if there is a sufficient match of the PMAC data record with the PMAC data for an existing cluster. At 150, a determination is made of the cluster center PMAC data (i.e., representative identifier data) for the clusters that exist up to that point in time. This is also where cluster re-evaluation, referred to above, may be performed. At 160, comparisons are made between the cluster center PMAC data (representative identifier data) of the existing clusters to determine whether any two or more clusters can be merged together. The analysis performed at 160 is the same as the comparison analysis performed at 110 between PMAC data records. However, in the case of cluster-level analysis at 160, the comparisons that are made are between the representative identifier data for cluster records. Outcomes of the analysis at 160 include merging together identifier data for multiple cluster records whose representative identifier data is substantially similar and thus consistent with a single TD. A cluster may be split apart when the identifier data (members) of that cluster are no longer substantially similar to each other and/or to the cluster center (representative identifier data for the cluster). Then at 170, the WLC generates a report of its cluster data to the server 50.

Figure 8:
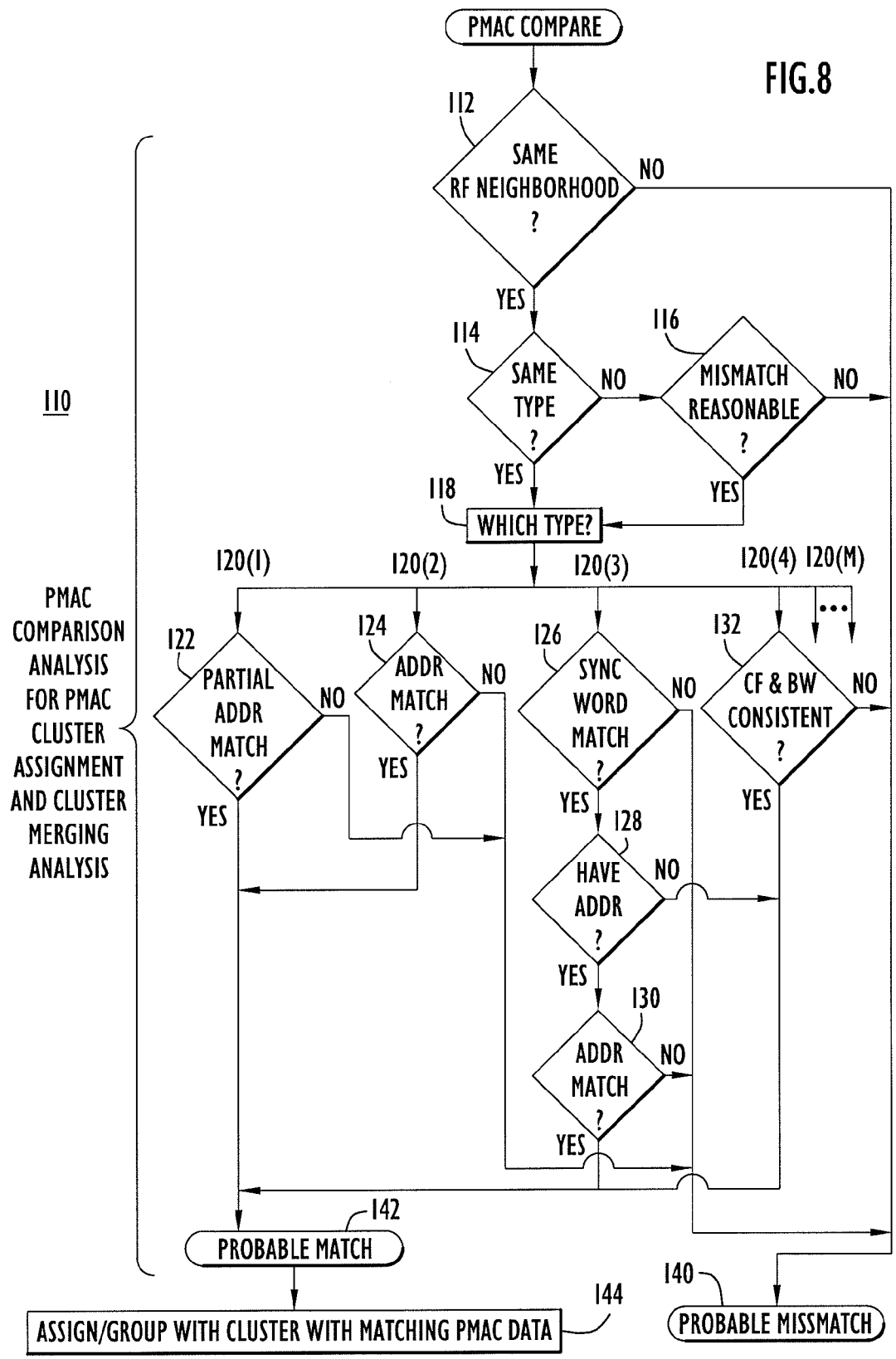
FIG. 8 is an example of a flow chart depicting a process for comparing identifier data associated with detections of wireless device emissions across multiple radio devices.

Turning to FIG. 8, the PMAC comparison process 110 is now described. This process is performed for PMAC data contained in IDR messages received from multiple sensors.

In one embodiment, the WLCs 40(1)-40(N) perform the PMAC comparison process for their associated sensors. However, the server 50 could also perform this process as well for groups of, or all, sensors in the system under its control. Initially, when two or more PMAC data records are compared, at 112 it is first determined whether those PMAC data records originated from sensors that are in the same RF "neighborhood", that is, from two or more sensors that are determined to be capable of receiving transmissions from the same target device (or in general could be expected to detect the same RF energy). One way to determine whether two or more sensors are RF "neighbors" is to have all of the sensors report to their associated WLC the other sensors that they can detect, assuming that the sensors are devices, e.g., APs or other devices that are capable of transmitting and receiving signals. Another technique for ascertaining RF proximity is to evaluate the RSSI or SNR in the PMAC record to be sure that it is consistent with known positions of the sensors that reported those PMAC records. Still another technique is to assign RF proximity of first and second sensors when the first and second sensors can both detect signals from a third sensor. Yet another technique is to determine the actual (x,y,z) coordinates of the sensors, either as they are deployed or after deployment using location techniques. Alternatively, sensor proximity may be defined statically by the system administrator. Thus, the evaluation made at 112 serves as a filtering step to reduce the amount of PMAC data that needs to be compared.

Another way of further filtering the PMAC data to be compared is based on detection timing. It is expected that two or more sensors detecting the same device will initially detect it at approximately the same time depending on the operating mode the sensors are in at the time and how often the sensor monitors the frequency where the detected device operates. Individual sensors may indicate a notion of expected detection time variance to the WLC performing correlation function. Devices detected within a time range defined by the variance parameter are considered as candidates for a PMAC comparison and thus possible merge.

Referring again to FIG. 8, after the RF proximity test is passed at 112, then at 114 the device type fields of the PMAC data records are compared to ensure that further PMAC data comparisons are made only on devices that are the same type. If the device type fields of the PMAC data records do not match, then at 116, a further examination is made of the PMAC data records to determine whether a type mismatch is actually reasonable given other information contained in the PMAC data. For example, one sensor may correctly identify a TD as being a video camera, whereas as another sensor with that receives a transmission from that TD with a lower SNR can detect that a continuous transmitter is present, but cannot determine that it is video camera. Another example is a network of devices with very short inter frame spacing, such that reliable separation of pulses varies with SNR. In such a case one sensor may correctly detect a device as being part of a TDD network, and another sensor may incorrectly identify it as a continuous transmitter. Thus, as indicated by FIG. 8, additional identifier data is compared at 118 for identifier data containing the same device type or for identifier data containing a device type that could be reasonably incorrectly identified as a different device type based on radio frequency characteristics detected by different sensors.

Next, at 118, further PMAC data comparisons are determined based on the device type of the PMAC data records. To this end, there are several device type specific PMAC comparison tests shown at 120(1)-120(M) for the M different device types. For example, comparison test 120(1) is for PMAC data records for Bluetooth™ type devices, comparison test 120(2) is for PMAC data records for 802.11 frequency hopping (FH) devices, comparison test 130(3) is for DECT-like type devices, comparison test 120(4) is for continuous type devices, and so on. Each device specific comparison test may have a unique set of comparisons to be made to determine whether the PMAC data records match. For example the comparison test 120(1) comprises at 122 comparing the partial address information contained in the Bluetooth device type PMAC data records. For the comparison test 120(2) used for 802.11 FH devices, comparison is made at 124 of the address information in the PMAC data records. Comparison test 120(3) comprises comparing at 126 the sync words of the PMAC data records and if they match, then determining whether at 128 the PMAC data records have address information. If so, then at 130, the address information in the PMAC data records is compared. The comparison test 120(4) for continuous type devices comprises comparing at 132 the center frequency and bandwidth information on the PMAC data records to determine whether they are consistent with being associated with the same device. As noted above, a measurement device (i.e., sensor) will inherently have variation in measurement, and could have impairments that cause an exact match to be unlikely. Instead a probability of matching can be associated with differences in these measurements.

If any of the device specific comparison tests 120(1)-120(M) fail, then at 140 or if the RF neighborhood test fails, it is declared that the PMAC data records being compared do not match. On the other hand, if a device specific comparison test succeeds or passes, then the process continue to 142 where a declaration of a probable match is made.

Next, at 144, as a result of a successful PMAC comparison, the matching PMAC data records are merged together as being part of the same cluster. The cluster may be one that is already existing or may be one that has yet to be formed, but nevertheless will be formed based on the most recently acquired PMAC data.

When a PMAC data record from a group of related transmitters (e.g., cordless phone base station and mobile stations) detected by an AP cannot be reliably merged with a PMAC data record within another group of related transmitters as seen by another AP, the PMAC comparison logic may allow clustering of all members within each group into a single entity for reporting. An example of this might be a TDD network, where a given sensor may be able to distinguish between the different transmitters by having a phase-locked loop (PLL) and using relative timing to detect assigned slots, but exporting this distinction would require tracking very accurate timing between sensors.

Referring back to FIG. 7, after the PMAC comparison process 110, the cluster center of each cluster is determined. That is, the PMAC data record that best represents the "center" for a cluster is determined based on RSSI and/or SNR among the PMAC data records for the cluster. In the example of FIG. 6, the PMAC data record from sensor 10(1) would be deemed the center of the cluster 70(1). At 160, cluster merge analysis is performed based on the cluster center PMAC records of the outstanding clusters. After cluster merge analysis is performed, the WLCs send a report based on the information for the current cluster configuration. When multiple sensors connected to a common WLC detect the same device, then the PMAC data records for these device detections can be clustered together at the WLC across sensors. Other devices which are only detected by a single sensor can be thought of as conceptually belonging to a cluster of one.

Figure 9:
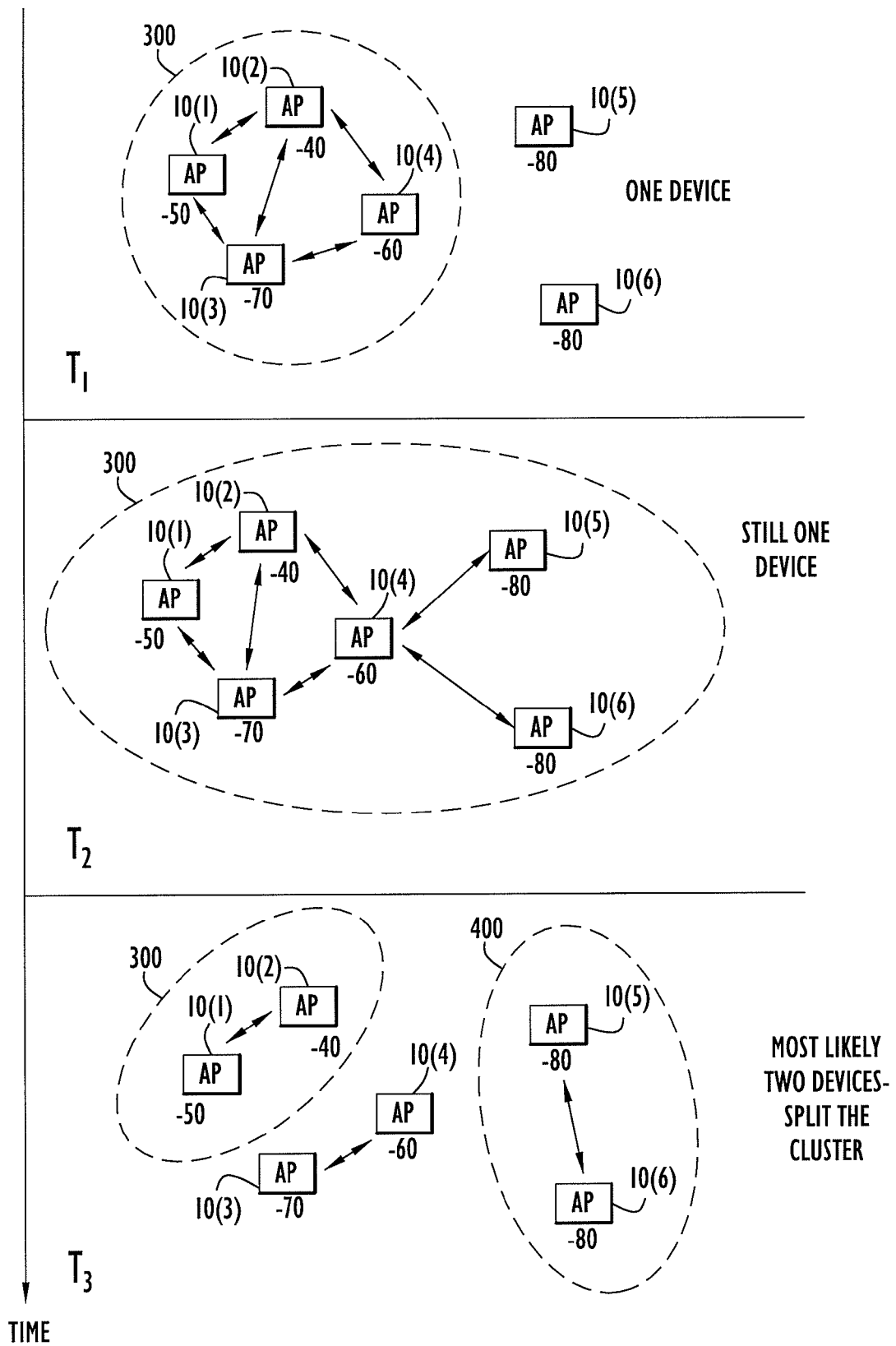
FIG. 9 is a block diagram illustrating an example of analyzing a cluster over time.

Turning to FIG. 9, an example of a cluster merge/split analysis scenario is described. As in FIG. 6, the arrows in FIG. 9 indicate that the PMAC data records from the corresponding sensors are substantially similar. At some time instant $T_1$, there is exists data for a cluster 300 of PMAC data records from sensors 10(1), 10(2), 10(3) and 10(4), with the corresponding RSSI as indicated. Note that the sensors 10(5) and 10(6) did not report PMAC data records that are substantially similar with those of cluster 300. At this point in time, it is fairly clear that the cluster 300 represents one device.

Some amount of time later, data for the cluster 300 is as depicted in FIG. 9 at time $T_2$. The sensors 10(5) and 10(6) have reported PMAC data records for device detections that have been merged into cluster 300. Still at this point, cluster 300 seems stable and indicative of a single device detected by sensors 10(1), 10(2), 10(4) and 10(5).

Some time later, data is as shown at $T_3$ in FIG. 9. Now, the PMAC data records reported by sensors 10(1) and 10(2) are still substantially similar, but sensors 10(3) and 10(4) do not report PMAC data records that are substantially similar with the PMAC data records from sensors 10(1) and 10(2). Also, the PMAC data records from sensors 10(5) and 10(6) are substantially similar to each other, but are not similar to the PMAC data records from sensors 10(1) and 10(2). Thus, a new cluster 400 is created from cluster 300, where cluster 300 represents one device and cluster 400 represents another device.

There are three levels of clustering. The first level is at the sensor/AP-level, the second is at the WLC level and the third is at the server level. An AP level cluster is referred to as an AP-Cluster, a WLC level cluster is referred to as a Controller-Cluster and a server level cluster is referred to as a Server-Cluster. For all levels of clustering:

Data for each individual member of the cluster is stored, as needed. For example, non-centers of AP-Clusters are not needed at the server.

A single member of the cluster at each level is denoted the center of the cluster, and this occurs at each level of the hierarchy, so that there is a center for a particular AP-Cluster known as the AP-center, a center for the Controller-Cluster known as the Controller-center, and a center for the Server-Cluster known as the Server-center. Only the centers of a hierarchy level are eligible to be the center of the next higher level.

The center of any cluster can change over time, as more sensors detect the device, or if the device is mobile. This might also happen due to changes in the RF environment, such as doors opening/closing.

The following describes how IDR reports are processed from the perspective of the multiple levels of clustering. When an IDR report is received from sensor, it is first evaluated by a unique key, such as a sensor address and instance identifier. If the incoming entry already exists, all the IDR data is updated, including the RSSI and PMAC data stored for the incoming entry.

Now, levels of the hierarchy are analyzed, starting with the AP-Cluster. It is determined whether the incoming entry is the center of its cluster at the current level. If it is not, then a comparison is made of the RSSI and/or SNR among the PMAC records for the cluster to determine whether the incoming entry should be the cluster center. If no cluster already exists that the incoming entry can be assigned to, then a new cluster is created.

Periodically, the clusters are analyzed. Starting at the AP-Cluster level, evaluate all clusters at this level to determine if the center of a cluster has been up for longer than a configured number of timer iterations. A level of "aggressiveness" for the PMAC comparison may be adjusted over time. For example, the required level of PMAC similarity at the first timer expiration may be conservative, and at subsequent iterations progressively more liberal levels of similarity may be used. The PMAC data for the current cluster center entry is compared against the center of all other clusters at this level in the hierarchy (at AP-Cluster level only consider entries from same AP, from other levels only consider clusters that have a center that is one hop away from this entry so that when the cluster is forwarded to server, the server will see it for the first time and evaluate if it can be clustered with another pre-existing cluster). If there is a match between the current cluster center and another cluster center, the two clusters are merged. The merge cascades to upper levels such that the WLC notifies the server of the merge normally, and the server joins its clusters at its level also. The PMAC data for all members of one cluster are merged to the other, such as from the "youngest" cluster to the other cluster. Next, the cluster centers of the two clusters are compared in order to select the center of the merged clusters.

An IDR may be removed due to a sensor reporting a down event or because it timed out at a WLC or at the server. Starting at the AP-Cluster level, if it is determined that the deleted entry was not the center of the level, it is simply removed. If the deleted entry was the only member of the cluster at this level, then the cluster is deleted. Otherwise, if the deleted entry was the cluster center, a new cluster center is determined at the WLC level and then at the server level. When an AP-Cluster or Controller-Cluster is deleted, then these deletions are propagated to the server. When the AP-center or Controller-center changes, these changes can be updated on regular update cycles.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims.

What is claimed is:

1. A method comprising:
   at a plurality of first devices, receiving wireless energy at different locations in a region where multiple target devices are emitting;
   providing a plurality of wireless controllers each of which is connected to and associated with a corresponding subset of the plurality of first devices, and a main server that is connected to the plurality of wireless controllers;
   generating identifier data associated with reception of emissions from target devices at multiple first devices;
   grouping together similar identifier data associated with received emissions at multiple first devices into a cluster record that potentially represents the same target device detected by multiple first devices, wherein grouping is performed at each of a plurality of hierarchical levels comprising a lowest level associated with the first devices, a next higher level associated with the wireless controllers and a highest level associated with the main server;
   designating one identifier data of each cluster record to serve as representative identifier data for the cluster record that potentially represents the same target device detected by multiple first devices, wherein designating is performed at each hierarchical level such that there is representative identifier data for a cluster record at the level of the first devices, representative identifier data for a cluster record at the wireless controller level and representative identifier data for a cluster record at the main server level, and such that only the representative identifier data of cluster records at one hierarchical level are eligible to be the representative identifier data at the next higher level; and
   storing data representing a plurality of cluster records from identifier data associated with received emissions made over time by multiple first devices.

2. The method of claim 1, wherein grouping comprises comparing identifier data associated with detected target device emissions at multiple first devices.

3. The method of claim 2, wherein comparing comprises comparing identifier data generated by only those first devices which are determined to be capable of receiving transmissions from the same target device.

4. The method of claim 2, wherein comparing comprises comparing identifier data associated with detected target device emissions which are received within a time range of each other at multiple first devices.

5. The method of claim 2, wherein generating identifier data comprises generating a semi-unique identifier comprising an address of a network if contained in the received emission, and depending on a particular received emission, one or more of: a unique identifier of the target device if contained in the received emission; a synchronization word associated with the received emission; radio frequency characteristics associated with the received emission including bandwidth and center frequency; modulation type of the received emission; and device type if determined for the received emission.

6. The method of claim 5, wherein comparing comprises comparing device type information contained in the identifier data from multiple first devices, and comparing additional information contained in the identifier data from multiple first devices only for identifier data containing the same device type or for identifier data containing a device type that could be reasonably incorrectly identified as a different device type based on radio frequency characteristics detected by different first devices.

7. The method of claim 6, wherein comparing additional information comprises comparing select information in the identifier data depending on device type.

8. The method of claim 1, further comprising designating the identifier data that has the strongest received signal strength or signal-to-noise ratio as said representative identifier data for the cluster record.

9. The method of claim 1, further comprising comparing the representative identifier data for multiple cluster records and merging together identifier data for multiple cluster records whose representative identifier data are substantially similar.

10. The method of claim 9, further comprising splitting a cluster record into multiple cluster records when identifier data of the cluster record are no longer substantially similar to each other and/or to the representative identifier data for the cluster record.

11. The method of claim 1, further comprising changing the representative identifier data for a cluster based on newly generated identifier data.

12. The method of claim 1, wherein grouping is repeated over time in order to make adjustments to cluster records based on newly generated identifier data, and further comprising analyzing the cluster records over time to correlate detections of target devices across multiple first devices.

13. The method of claim 12, wherein analyzing comprises comparing cluster records using a level of similarity used for grouping of cluster records that changes over time such that the level of similarity at a first iteration is more conservative than at subsequent iterations.

14. The method of claim 1, further comprising buffering identifier data generated over a period of time prior to performing said grouping.

15. A system comprising:
a plurality of radio devices positioned at different locations in a region and configured to receive wireless emissions where multiple target devices are emitting and to generate identifier data associated with reception of emissions from target devices;
a plurality of wireless controllers each of which is connected to and associated with a corresponding subset of the plurality of radio devices;
a main server that is connected to the plurality of wireless controllers;
a computing device coupled to receive identifier data generated by the plurality of radio devices, wherein the computing device is configured to:
at each of a plurality of hierarchical levels comprising a lowest level associated with the radio devices, a next higher level associated with the wireless controllers and a highest level associated with the main server, group together similar identifier data associated with received emissions at multiple radio devices into a cluster record that potentially represents the same target device detected by multiple radio devices;
designate one identifier data of each cluster record to serve as representative identifier data for the cluster record that potentially represents the same target device detected by multiple radio devices, wherein the computing device is configured to perform the designate operation at each hierarchical level such that there is representative identifier data for a cluster record at the level of the radio devices, representative identifier data for a cluster record at the wireless controller level and representative identifier data for a cluster record at the main server level, and such that only the representative identifier data of cluster records at one hierarchical level are eligible to be the representative identifier data at the next higher level; and
store data representing a plurality of cluster records from identifier data associated with received emissions made over time by multiple radio devices.

16. The system of claim 15, wherein the computing device is configured to group similar identifier data by comparing identifier data associated with detected target device emissions at multiple radio devices.

17. The system of claim 16, wherein the computing device is configured to compare identifier data generated by only those radio devices which are determined to be capable of receiving emissions from the same target device.

18. The system of claim 15, wherein the radio devices are configured to generate identifier data that comprises a semi-unique identifier comprising an address of a network if contained in the received emission, and depending on a particular received emission, one or more of: a unique identifier of the target device if contained in the received emission; a synchronization word associated with the received emission; radio frequency characteristics associated with the received emission including bandwidth and center frequency; modulation type of the received emission; and device type if determined for the received emission.

19. The system of claim 18, wherein the computing device is configured to compare device type information contained in the identifier data from multiple radio devices, and to compare additional information contained in the identifier data from multiple radio devices only for identifier data containing the same device type or for identifier data containing a device type that could be reasonably incorrectly identified as a different device type based on radio frequency characteristics detected by different radio devices.

20. The system of claim 15, wherein the computing device is further configured to analyze the cluster records over time to correlate detections of target devices across multiple radio devices.

21. The system of claim 15, wherein the computing device is configured to compare the representative identifier data for multiple cluster records and merge together identifier data for multiple cluster records whose representative identifier data are substantially similar.

22. The system of claim 21, wherein the computing device is further configured to split a cluster record into multiple cluster records when identifier data of the cluster record are no longer substantially similar to each other and/or to the representative identifier data for the cluster record.

23. The system of claim 15, wherein the computing device is configured to compare cluster records using a level of similarity used for grouping of cluster records that changes over time such that the level of similarity at a first iteration is more conservative than at subsequent iterations.

24. A non-transitory computer readable media comprising computer instructions to be executed by a processor, wherein the instructions configure the processor to:
at each of a plurality of hierarchical levels comprising a lowest level associated with a plurality of radio devices, a next higher level associated with a plurality of wireless controllers each connected to a corresponding subset of the radio devices and a highest level associated with a main server connected to the plurality of wireless controllers, group together similar identifier data associated with received emissions at multiple radio devices into a cluster record that potentially represents the same target device detected by multiple radio devices;
designate one identifier data of each cluster record to serve as representative identifier data for the cluster record that potentially represents the same target device detected by multiple radio devices, wherein the instructions operable to designate comprise instructions operable to designate at each hierarchical level such that there is representative identifier data for a cluster record at the level of the radio devices, representative identifier data for a cluster record at the wireless controller level and representative identifier data for a cluster record at the main server level, and such that only the representative identifier data of cluster records at one hierarchical level are eligible to be the representative identifier data at the next higher level;

store data representing a plurality of cluster records from identifier data associated with received emissions made over time by multiple radio devices; and correlate detections of target devices across multiple radio devices.

25. The non-transitory computer readable media of claim 24, wherein the instructions further configure the processor to generate a semi-unique identifier comprising an address of a network if contained in the received emission, and, depending on a particular received emission, one or more of: a unique identifier of the target device if contained in the received emission; a synchronization word associated with the received emission; radio frequency characteristics associated with the received emission including bandwidth and center frequency; modulation type of the received emission; and device type if determined for the received emission.

26. The non-transitory computer readable media of claim 24, wherein the instructions further configure the processor to to compare the representative identifier data for multiple cluster records and merge together identifier data for multiple cluster records whose representative identifier data are substantially similar.

27. The non-transitory computer readable media of claim 24, wherein the instructions further configure the processor to to compare cluster records using a level of similarity used for grouping of cluster records that changes over time such that the level of similarity at a first iteration is more conservative than at subsequent iterations.

* * * * *